United States Patent [19]

Ito et al.

[11] 4,037,651
[45] July 26, 1977

[54] TEMPERATURE CONTROL APPARATUS OF AIR CONDITIONER FOR AUTOMOBILES

[75] Inventors: Tosikatu Ito, Tohkai; Reijiro Takahashi, Katsuta, both of Japan

[73] Assignee: Hitachi, Ltd., Tokyo, Japan

[21] Appl. No.: 655,533

[22] Filed: Feb. 5, 1976

[30] Foreign Application Priority Data

Feb. 7, 1975 Japan .................................. 50-15402

[51] Int. Cl.² ............................................. F25B 29/00
[52] U.S. Cl. ....................................... 165/30; 91/365; 236/82; 237/12.3 B
[58] Field of Search ............... 236/82, 87; 91/365; 237/12.3 B; 165/30, 42, 43

[56] References Cited

U.S. PATENT DOCUMENTS

| | | | |
|---|---|---|---|
| 2,225,321 | 12/1940 | Schwendner et al. | 91/365 X |
| 2,298,112 | 10/1942 | Edwards et al. | 91/365 X |
| 2,789,543 | 4/1957 | Popowsky | 91/365 |
| 2,947,286 | 8/1960 | Baltus et al. | 91/365 |
| 3,151,810 | 10/1964 | Puster | 91/365 X |
| 3,809,314 | 5/1974 | Engleke et al. | 236/49 |
| 3,877,638 | 4/1975 | Amano et al. | 236/87 X |

*Primary Examiner*—William E. Wayner
*Assistant Examiner*—William E. Tapolcai, Jr
*Attorney, Agent, or Firm*—Beall & Jeffery

[57] ABSTRACT

A temperature control apparatus of an air conditioner for automobiles, which comprises a blower for feeding air through a cooling unit and a heating unit disposed in an air passage, an air mix door for controlling the amount of air passing through the heating unit, an actuator for actuating said door, a negative pressure source for applying a negative pressure to said actuator through a controller, a sensor emitting a negative pressure signal in response to the temperature in a cab of an automobile and a regulator emitting a negative pressure signal in response to the change of the position of said door, wherein the output negative pressure signal of the temperature sensor is compared with the output negative pressure signal of the regulator by said controller and a negative pressure is applied to the actuator according to a deviation between said two output signals to control the degree of opening of said air mix door so as to maintain the temperature in the cab at a substantially constant level.

15 Claims, 7 Drawing Figures

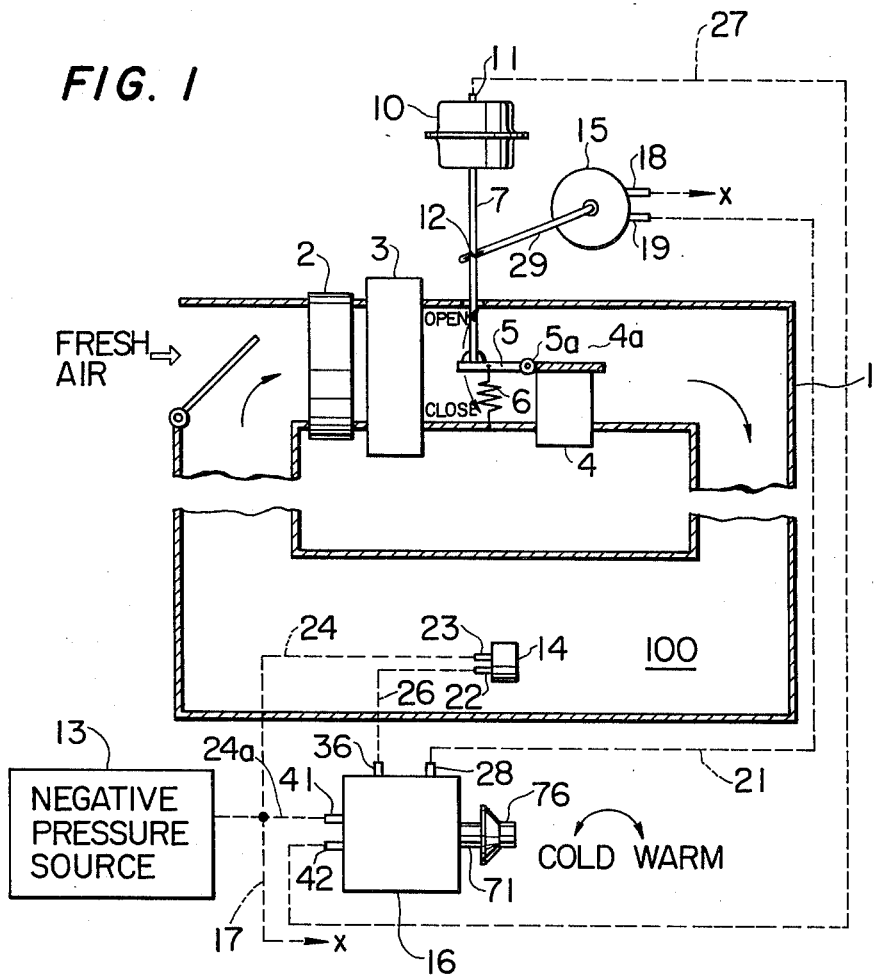
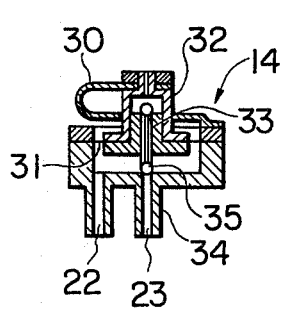

TEMPERATURE CONTROL APPARATUS OF AIR CONDITIONER FOR AUTOMOBILES

BACKGROUND OF THE INVENTION

This invention relates to a temperature control apparatus of an air conditioner for automobiles. More particularly, the invention relates to a temperature control apparatus applicable to an air conditioner for automobiles, which comprises a cooling unit disposed on an air passage and a heating unit disposed on the air passage downstream of the cooling unit, the amount of air passing through said heating unit being changeable by an air mix door, wherein the temperature in an automobile cab can be maintained at a desired level by changing the ratio of the amount of air passing through the cooling unit and heating unit to the amount of air passing through the cooling unit and bypassing the heating unit by means of said air mix door.

An air conditioner including a cooling unit and a heating unit having an air mix door which is disposed downstream of the cooling unit is known in the art and is generally called "re-heat air mix type conditioner."

Known methods for controlling the air mix door in this known apparatus are roughly divided into two types. According to one type, the temperature in an automobile cab is converted to an electric signal by means of a thermistor or the like, this signal is compared with the desired standard value, and a damper is actuated according to the deviation by electric means such as a solenoid or by converting the electric signal to a negative pressure. According to the other type, a sensor emitting a negative pressure signal according to the temperature in the cab is used, the output signal of the sensor is compared with the desired standard value and the air mix door is actuated by a negative pressure output according to the deviation.

These two methods, however, have the following defects.

In the former method, though an electric output can be obtained from the temperature sensor, since the output signal is very weak, provision of an amplifier is indispensable. Especially when the door is moved by a solenoid, the amplifying ratio should be drastically increased. When a solenoid is not used, provision of a electrically-negative pressure convertor is indispensable for converting the electric signal to a negative pressure, and the apparatus becomes expensive.

In the latter method, since an actuator is actuated by a negative pressure according to the negative pressure signal, a convertor or the like need not be provided but if the frictional resistance to sliding is changed in the door operated by the actuator, an error is caused in the displacement of the door and it is difficult to control the temperature to a desired level precisely. Since the air conditioner for an automobile is attached in a narrow space and it is used under violent vibration, the frictional resistance is readily changed in the portion of a rotary shaft and hence, the control reliability is very low.

SUMMARY OF THE INVENTION

It is therefore a primary object of the present invention to provide a temperature control apparatus having a high control precision and a high reliability.

Another object of the present invention is to provide a temperature control apparatus in which the temperature can be controlled to a prescribed level with less deviation or error even if the frictional resistance to sliding is changed in the air mix door.

The characteristic feature of the present invention is that a temperature sensor emitting a negative pressure signal according to the temperature in a cab of an automobile and a regulator emitting a negative pressure signal according to the degree of opening of the air mix door are provided and the degree of opening of the door is controlled by the negative pressure so that the difference between the output of the temperature sensorl and the output of the regulator is minimized.

BRIEF DESCRIPTION OF THE DRAWING

The present invention will now be described in detail by reference to embodiments shown in the accompanying drawings, in which:

FIG. 1 is a diagram illustrating the temperature control apparatus of an air conditioner for an automobile, to which the present invention is applied;

FIG. 2 is a view showing the section of the temperature sensor;

FIG. 3 is a view showing the section of the regulator;

DETAILED DESCRIPTION OF THE PREFERRED EMBODIMENT

Figure 5:
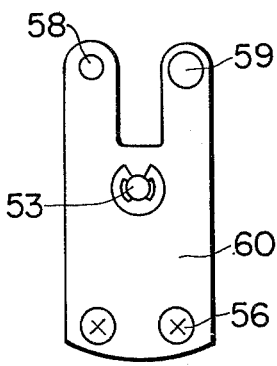
FIG. 5 is a view showing a valve operation plate which is applied to the pressure operation apparatus.

Referring now to FIG. 1 illustrating systematically the temperature control apparatus according to the present invention, a duct 1 is formed as an air passage and air inside the cab or outside the cab is fed by a blower 2. A cooling unit 3 and a heating unit 4 are disposed in the duct 1 and a bypass 4a is formed in the heating unit 4.

Upstream of the heating unit 4, an air mix door 5 is mounted rotatably around a shaft 5a to control the amount of air passing through the heating unit 4, and this door is always deviated in the closing direction by a spring 6. The upstream end of the duct 1 is opened to a suitable part in the cab 100.

The door 5 is connected to an actuator 10 through a rod 7, and when the negative pressure of a pipe 11 on the input side of the actuator 10 becomes high, the door 5 is displaced in the opening direction. The rod 7 is connected to a lever 29 of a pressure regulator 15 through a pin 12. The regulator 15 adjusts the negative pressure of a negative pressure source 13 according to the displacement of the rod 7 and emits an output signal from an output port 19.

A temperature sensor 14 is disposed at a suitable part in the cab 100. Reference numeral 16 denotes a pressure operation apparatus. The input port 18 of the regulator 15 is communicated with the negative pressure source 13 through a negative pressure pipe 17. Another negative pressure pipe 21 is disposed to connect the output port 19 of the regulator 15 with a control pressure inlet 28 of the pressure operation apparatus 16. Further, the input port 23 of the sensor 14 is communicated with the negative pressure source 13 through a pipe 24, and the output port 22 of the sensor 14 is connected to a control pressure inlet 36 of the pressure operation apparatus 16 through a pipe 26. An input port 41 of the pressure operation apparatus 16 is connected to the negative pressure source 13 through a pipe 24a, and an output port 42 of the apparatus 16 is connected by pipe 27 to the input port 11 of the actuator 10.

Referring now to FIG. 2 showing the section of the temperature sensor 14, the sensor 14 comprises a bimetal 30, one end of which is fixed to the sensor casing, a movable member 32 supported on the free end of the bimetal 30 and a diaphragm 31, and a double-head valve 35 disposed so that it is contacted with a valve head port 33 formed on the movable member 32 and a valve head port 34 connected with the input port 23. As the temperature inside the cab is elevated, the free end of the bimetal 30 is displaced upwardly and the movable member 32 displaces the double-head valve head 35 upwardly. Accordingly, the valve port 33 is closed and the valve port 34 is opened, whereby a large negative pressure signal is generated on the output port 22.

Figure 7:
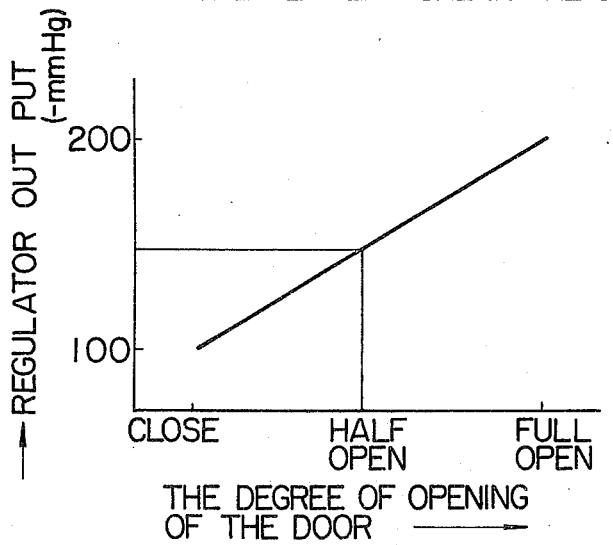
FIG. 7 is a diagram illustrating the output characteristics of the regulator.

FIG. 3 illustrates the inner structure of the pressure regulator 15 which is arranged so that the negative pressure on the output port 19 is changed according to the displacement of the lever 29. More specifically, a shaft 37 to which the lever 29 is fixed is screwed and fitted with the regulator proper and the lower end of the shaft 37 is connected to a movable member 43 supported on a diaphragm 40 through a spring seat 38 and a spring 39. A double-head valve 46 is disposed so that it is contacted with a valve port 44 formed on the movable member 43 and a valve port 45 connected with the input port 18. A spring 47 is disposed to always push up the diaphragm 49 with a weak force. The screwed engagement state of the regulator 15 with the shaft 37 is changed as the degree of opening of the air mix door 5 changes from the full open state to the full close state, and the elastic force of the spring 39 acting on the movable member 43 is changed to vary the output negative pressure as shown in FIG. 7.

Figure 4:
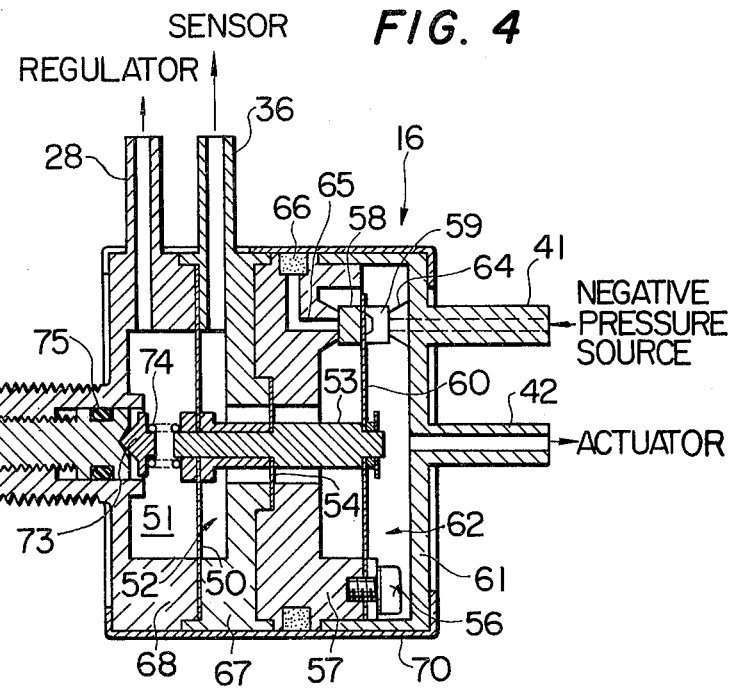
FIG. 4 is a view showing the section of the pressure operation apparatus.

FIGS. 4 and 5 illustrate the inner structure of the pressure operation apparatus 16. In the pressure operating apparatus 16, two negative pressure chambers 51 and 52 partitioned by a diaphragm 50 are formed, and these chambers are connected to control pressure inlets 28 and 36, respectively. The diaphragm 50 is connected at the center thereof to a shaft 53 so that the displacement generated by the pressure difference between the chambers 51 and 52 is transmitted to the shaft 53. A sealing diaphragm 54 is disposed in the vicinity of the central portion of the shaft 53 so that the air-tightness is maintained in the chamber 52 without inhibiting the displacement of the shaft 53 in the axial direction. A valve operation plate 60 is fixed to the right end of the shaft 53, and one end of the plate 60 is fixed to a housing 57 by a bolt 56 and the plate 60 has two valve heads 58 and 59 on the other end thereof.

A negative pressure chamber 62 is formed by the housing 57 and cover 61, and the valve operation plate 69 is disposed in this negative pressure chamber 62. Input port 41 and output port 42 are integrally formed on the cover 61, and a valve seat 64 is formed on an opening of the input port 41 on the side of the negative pressure chamber 62 so that the valve seat 64 faces a valve head 58.

On the side of the housing 57, a valve seat 65 is formed at a position facing the valve head 58, and this valve seat 65 is communicated with open air through a filter 66.

The sealing diaphragm 54 is supported between housing 57 and spacer 67, and the diaphragm 50 is supported between the spacer 67 and another housing 68. The cover 61, housing 57, spacer 67 and housing 68 are integrally assembled by a clamper 70 formed to surround their outer peripheries. An adjustment screw 71 is fitted to the housing 68 substantially along the axis of the shaft 53, and a spring seat 73 and a spring 74 are disposed between the inner end of the screw 71 and the left end of the shaft 53 so that the operation force for displacing the shaft 53 to the right is adjusted.

An O-ring 75 is disposed to keep air-tightness between the screw 71 and housing 68, and a dial 76 is fixed to the left end of the screw 71. As shown in FIG. 5, the valve operation plate 60 is shaped in a forked form in the upper portion thereof, and valve heads 58 and 59 are attached to the forked ends of the valve operation plate 60. Dimensions of these members are decided so that when the valve operation plate 60 is positioned midway between the valve seats 64 and 65 as shown in FIG. 4, the valve heads are contacted with the corresponding valve seats.

Figure 6:
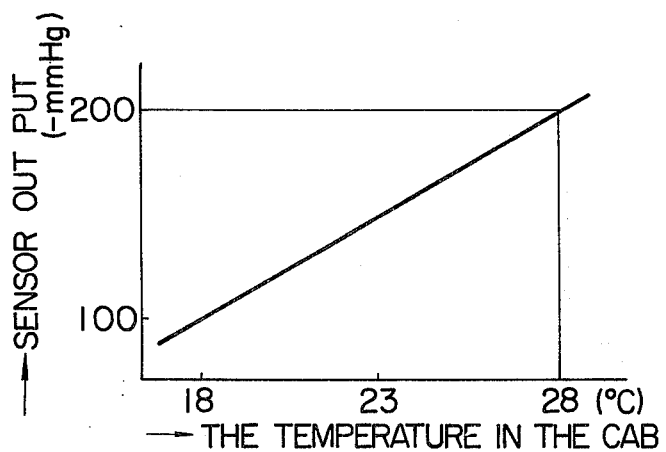
FIG. 6 is a diagram illustrating the output characteristics of the temperature sensor.

In the system shown in FIG. 1, the output negative pressure from the temperature sensor is increased as the temperature is elevated, as shown in FIG. 6, and the regulator is arranged so that the regulator puts out a large negative pressure as the air mix door is changed from the closed state to the opened state.

When the air conditioner is operated in a cab maintained at 28° C., the output negative pressure from the temperature sensor 14 is about −200 mm Hg. If the door 5 is in the half-open state at this point, the output negative pressure from the regulator 15 is −150 mm Hg. The output negative pressures from the temperature sensor 14 and regulator 15 are introduced into negative pressure chambers 52 and 51 of the pressure operation apparatus 16, and since the negative pressure signal from the temperature sensor 14 is larger than that from the regulator 15, in the diaphragm 50 a force for displacement in the right direction is generated and the valve operation plate 60 is displaced to the right through the shaft 53.

When displacement is caused in the operation plate 60, the valve head 59 is kept in the state pressed to the valve seat 64 but the valve head 58 separates from the valve seat 65, whereby the negative pressure chamber 62 is communicated with open air and the negative pressure to the actuator 10 is decreased to displace the door 5 in the closing direction by means of the spring 6. Thus, the amount of air passing through the heating unit 4 is decreased and the amount of air passing through the bypass 4a is increased, whereby colder air is fed into the vehicle cab 100. As the temperature detected by the sensor 14 is thus lowered gradually, the output negative pressure of the sensor 14 is gradually reduced according to the characteristic curve shown in FIG. 6 and finally, it is balanced with the negative pressure output of the pressure regulator 15. When the regulator output is thus balanced with the sensor output, the diaphragm 50 and shaft 53 in the pressure operation apparatus 16 are returned to the positions shown in FIG. 4, and the valve heads 58 and 59 are contacted with the valve seats 65 and 64, whereby the negative pressure is maintained at a certain level and the air mix door 5 is fixed at this position.

It is possible to determine the temperature in the vehicle cab substantially exclusively depending on the degree of opening of the air mix door 5 if capacities of the cooling unit 3 and heating unit 4 are made sufficiently large. Accordingly, when it is desired to maintain the temperature in the vehicle cab at, for example, 23° C., the capacities of the cooling unit 3 and the heating unit 4 are decided so that the vehicle cab is maintained at about 23° C. if the door 5 is kept in the half-open state.

As the inside temperature is lowered and the sensor output is reduced, contrary to the above-mentioned case, a force directed to the left is imposed on the diaphragm 50 and shaft 53, and the valve head 59 separates from the valve seat 64, whereby the negative pressure of the negative pressure source 13 is imposed on the negative pressure chamber 62 and the door 5 is displaced in the opening direction. When the temperature of the vehicle cab is 18° C., the door 5 is promptly displaced to the full open position and the regulator output is reduced. Accordingly, the force acting on the diaphragm 50 of the pressure operation apparatus 16 is balanced with the regulator output and the valve heads 58 and 59 press the valve seats 65 and 64 to maintain the door in the full open state.

When the door 5 is kept in the full open state, the temperature of air fed into the motor vehicle cab or compartment to be air conditioned from the duct 1 is gradually elevated and the output negative pressure of the sensor 14 is gradually elevated. Accordingly, the balance is broken in the pressure operation apparatus 16, and the door 5 is displaced in the closing direction. When the temperature in the vehicle cab is thus elevated to about 23° C., a stable state is attained at a stability point where the regulator output is balanced with the sensor output.

For simplification of the explanation, in the foregoing embodiment, the output of the temperature sensor is simply compared with the output of the regulator in the pressure operation apparatus. It is, however, possible to adopt a method in which in order to increase the influence of one of the outputs, comparison is made after amplifying one or both of the outputs. For example, in case the output negative pressure of the temperature sensor is amplified, the response to the temperature change can be quickened.

The stability point between the cab temperature and the degree of opening of the door can be adjusted by controlling the initial flexural force applied to the diaphragm 50 by turning the adjustment dial 76.

As is seen from the foregoing illustration, according to the present invention, the temperature control can be accomplished effectively merely by disposing means emitting negative pressure signals depending on the temperature in the vehicle cab and the degree of opening of the air mix door and an apparatus acting on the air mix door so that the deviation of the negative pressure signals is minimized, and an electricity-negative pressure convertor or amplifier which should inevitably be used in the conventional techniques need not be provided, whereby the cost of the temperature controller is reduced and in turn, the frequency of occurrence of troubles is reduced with increase of the reliability. Further, since the pressure regulator is mechanically co-operated with the degree of opening of the door to emit negative pressure signals, the response characteristic is improved, and if this pressure regulator is combined with the operation apparatus shown in FIG. 4, since the time for communication of the negative pressure chamber 62 with the negative pressure source 13 is shortened, even if an engine negative pressure is used as the negative pressure source, no bad influences are given to the engine.

The temperature sensor and actuator to be used in the present invention are not limited to those illustrated in FIGS. 2 and 3, and any of members capable of generating negative pressure outputs according to the temperature and mechanical displacements can be used in the present invention. Further, it is not required that these members should have completely proportional characteristics as shown in FIGS. 6 and 7, but members having approximately proportional characteristics may be used in the present invention.

As is seen from the foregoing illustration, according to the present invention, the temperature control can be accomplished completely mechanically by utilizing negative pressures, and any particular means need not be mounted for conversion, and therefore, an apparatus having a high reliability can be provided at a low cost.

While a preferred embodiment of the present invention has been described specifically in detail for purposes of illustration and the advantages of the details, with modifications and variations, further embodiments, modifications and variations are contemplated according to the broader aspects of the present invention, all as determined by the spirit and scope of the following claims.

What is claimed is:

1. A temperature control apparatus of an air conditioner for motor vehicles having a negative pressure source and a compartment to be air conditioned, comprising: an air passage leading to the compartment; a cooling unit and a heating unit disposed in said air passage; blower means for feeding air through said cooling unit and heating unit disposed in said air passage; an air passage bypass formed in parallel to said heating unit; air mix door means for controlling the amount of air passing through said heating unit and said bypass; actuator means for actuating said door means by an applied negative control pressure; temperature sensor means emitting a negative pressure signal in response to the temperature in the compartment of the motor vehicle; regulator means emitting a negative pressure signal in response to the mechanical displacement of said door means; and controller means for applying a negative control pressure to said actuator means from the negative pressure source by comparing the output negative pressure signal of said temperature sensor means with the output negative pressure signal of said regulator means and producing a negative control pressure accroding to the deviation between said output signals to control the degree of opening of said air mix door means so as to maintain the temperature in the compartment at a substantially constant level.

2. A temperature control apparatus as set forth in claim 1, wherein said heating unit is disposed downstream of said cooling unit and said mix door is positioned at the air passage branching point of said bypass and said heating unit.

3. A temperature control apparatus as set forth in claim 1, wherein said controller means includes a chamber to which the output negative pressure of said temperature sensor means is applied, a chamber to which the output negative pressure of said regulator means is applied and a flexible member capable of generating forces in reverse directions by the negative pressures of both said chambers, respectively, and said controller means further includes means for connecting and disconnecting the negative pressure source and the actuator means according to the displacement of said flexible member.

4. A temperature control apparatus as set forth in claim 3, wherein said flexible member is a diaphragm partitioned wall between said two chambers.

5. A temperature control apparatus as set forth in claim 4, wherein said controller means includes spring means for imparting a bias in one direction to said flexible member and manually operated means for changing the bias of said spring means from the outside of said controller means.

6. A temperature control apparatus as set forth in claim 5, wherein said controller means includes a valve operation plate drivingly connected to said flexible member, valve heads formed on said plate and respective valve ports corresponding to said valve heads as said means for connecting and disconnecting the negative pressure source and said actuator means, one valve port being communicated with the negative pressure source and the other valve port being connected to the open air, and said means for connecting and disconnecting the negative pressure source being so arranged that when said valve operation plate is displaced in one direction, said actuator means is connected to the negative pressure source and when said valve operation plate is displaced in the opposite direction, the negative pressure source and said actuator means are disconnected and said actuator means is connected to the open air.

7. A temperature control apparatus as set forth in claim 6, wherein said controller means includes a rod drivingly connecting said flexible member to said valve operation plate, and said spring means includes a spring and adjusting screw arranged coaxial with said rod.

8. A temperature control apparatus as set forth in claim 3, wherein said controller means includes spring means for imparting a bias in one direction to said flexible member and manually operated means for changing the bias of said spring means from the outside of said controller means.

9. A temperature control apparatus as set forth in claim 3, wherein said controller means includes a valve operation point drivingly connected to said flexible member, valve heads formed on said plate and respective valve ports corresponding to said valve heads as said means for connecting and disconnecting the negative pressure source and said actuator means, one valve port being communicated with the negative pressure source and the other valve port being connected to the open air, and said means for connecting and disconnecting the negative pressure source being so arranged that when said valve operation plate is displaced in one direction, said actuator means is connected to the negative pressure source and when said valve operation plate is displaced in the opposite direction, the negative pressure source and said actuator means are disconnected and said actuator means is connected to the open air.

10. A temperature control apparatus as set forth in claim 9, wherein said controller means includes a rod drivingly connecting said flexible member to said valve operation plate, and said spring means includes a spring and adjusting screw arranged coaxial with said rod.

11. A temperature control apparatus as set forth in claim 1, wherein said actuator means forming an expansible chamber having a moveable working member mechanically drivingly connected to move said door means; said temperature sensor means is fluid connected to the negative pressure source and mechanically produces the negative pressure signal from the compartment temperature input; said regulator means is fluid connected to the negative pressure source and mechanically driven by displacement of said door means to mechanically produce the negative pressure signal; and said controller means mechanically compares said two output signals and mechanically produces the negative control pressure.

12. A temperature control apparatus as set forth in claim 1, including mechanical means manually operable from within the air conditioned compartment for selectively changing the substantially constant level of temperature over a predetermined desired temperature range.

13. A temperature control apparatus as set forth in claim 11, including mechanical means manually operable from within the air conditioned compartment for selectively changing the substantially constant level of temperature over a predetermined desired temperature range.

14. A temperature control apparatus of an air conditioner for motor vehicles having a negative pressure source, an engine, and a compartment to be air conditioned, comprising: an air duct connected to the compartment; blower means for circulating air through said duct and the compartment; cooler means disposed in said duct to cool the air flowing through said duct; heater means disposed in said duct for reheating air passing through the heater; door means for controlling the proportion of air flowing in said duct that passes through said heater means; actuator means for controlling the movement of said door means according to an applied negative control pressure; regulator means for producing a negative output pressure from the negative pressure source according to the movement of said door; temperature sensor means for producing a negative output pressure from the negative pressure source according to the temperature within the compartment; means for comparing the negative output pressures from said regulator means and said temperature sensing means, and producing a corresponding displacement correlated to the deviation between said two output negative pressures; and controller means having a moveable throttling valve fluid inserted between the negative pressure source and said actuator means and producing a variable throttling according to said displacement so as to produce a negative control pressure for said actuator to minimize the deviation between said two output signals.

15. A temperature control apparatus as set forth in claim 14, including means producing the negative pressure source from said engine.

* * * * *